United States Patent
Iwachido et al.

(10) Patent No.: US 8,263,009 B2
(45) Date of Patent: Sep. 11, 2012

(54) EXHAUST GAS PURIFYING CATALYST

(75) Inventors: Kinichi Iwachido, Aichi (JP); Takayuki Onodera, Toyota (JP); Masanori Ide, Nagoya (JP); Hiroaki Ohhara, Anjo (JP); Mariko Ono, Himeji (JP); Akihisa Okumura, Himeji (JP); Masao Hori, Himeji (JP)

(73) Assignees: Mitsubishi Jidosha Kogyo Kabushiki Kaisha, Tokyo (JP); International Catalyst Technology, Inc., Auburn Hills, MI (US)

( * ) Notice: Subject to any disclaimer, the term of this patent is extended or adjusted under 35 U.S.C. 154(b) by 339 days.

(21) Appl. No.: 12/607,501

(22) Filed: Oct. 28, 2009

(65) Prior Publication Data

US 2010/0101220 A1  Apr. 29, 2010

(30) Foreign Application Priority Data

Oct. 29, 2008  (JP) ............................... P.2008-278901

(51) Int. Cl.
*B01D 50/00* (2006.01)
(52) U.S. Cl. ...................................... 422/171
(58) Field of Classification Search .................. 422/177, 422/180
See application file for complete search history.

(56) References Cited

U.S. PATENT DOCUMENTS

| | | | |
|---|---|---|---|
| 6,165,934 A * | 12/2000 | Gardner et al. | 502/330 |
| 6,887,444 B1 | 5/2005 | Yamamoto | |
| 2002/0159926 A1* | 10/2002 | Hanaoka et al. | 422/177 |

FOREIGN PATENT DOCUMENTS

| | | |
|---|---|---|
| JP | 11-223123 A | 8/1999 |
| JP | 2001-347139 A | 12/2001 |
| JP | 3724708 B2 | 12/2005 |
| JP | 2006-26635 A | 2/2006 |

OTHER PUBLICATIONS

Japanese Office Action issued in Japanese Patent Application No. 2008-278901 on Jan. 25, 2012.

* cited by examiner

*Primary Examiner* — Tom Duong
(74) *Attorney, Agent, or Firm* — Birch, Stewart, Kolasch & Birch, LLP (57) ABSTRACT

An exhaust gas purifying catalyst which is disposed in an exhaust pipe of an internal combustion engine, includes: a substrate; and a catalyst layer, supported in the substrate and including: noble metals including platinum (Pt) and palladium (Pd); a heat-resistant inorganic oxide; and a NOx trapping material. The exhaust gas purifying catalyst adsorbs NOx in an exhaust gas when an exhaust air-fuel ratio is in a lean state and desorbs and reduces the adsorbed NOx when the exhaust air-fuel ratio is in a stoichiometric state or a rich state. (Pt/Pd) which is a ratio of amount of the platinum (Pt) to amount of the palladium (Pd) is 0.7 or more and less than 1.0.

5 Claims, 9 Drawing Sheets

EXHAUST GAS PURIFYING CATALYST

BACKGROUND OF THE INVENTION

1. Field of the Invention

The present invention relates to an exhaust gas purifying catalyst for purifying exhaust gases emitted from an internal combustion engine by removing NOx therein.

2. Description of the Related Art

As internal combustion engines which are advantageous in reducing fuel consumption, there are known lean burning internal combustion engines on which an air-fuel ratio is controlled to be on the lean side of the stoichiometric air-fuel ratio and direct injection internal combustion engines in which fuel is injected directly into combustion chambers for lean burning (hereinafter, referred to generally as lean-burn engines). In the lean-burn engine which runs lean on stoichiometric (lean operation) to improve fuel economy, an exhaust gas purifying catalyst (a NOx trapping catalyst) is provided for purifying exhaust gases through reduction of NOx (oxides of nitrogen) therein.

According to related-art NOx trapping catalysts, there have been proposed various NOx trapping catalysts (for example, refer to JP-A-2006-26635). These NOx trapping catalysts are made as a catalyst having characteristics in which NOx in exhaust gases is adsorbed as nitrate X—NO3 in an oxidation atmosphere (a lean air-fuel ratio) in which the concentration of reductants is low and the adsorbed NOx is reduced to N2 in a reduction atmosphere (a stoichiometric air-fuel ratio or a rich air-fuel ratio) in which a large amount of reductants such as CO (carbon monoxide) and HC (hydrocarbons) exists.

In the related-art NOx trapping catalyst of this type, NOx in exhaust gases is adsorbed to be prevented from being emitted into the atmosphere by the engine running with the lean air-fuel ratio, and the adsorbed NOx is then desorbed for reduction by controlling the air-fuel ratio to be shifted to the rich side periodically. In order to obtain such a function, in the NOx trapping catalyst, catalyst layers are supported in a honeycomb substrate formed from a ceramic material, and the catalyst layers each contain, for example, noble metals such as platinum (hereinafter, abbreviated to Pt), palladium (hereinafter, abbreviated to Pd), and rhodium (hereinafter, abbreviated to Rh), a heat-resistant inorganic oxide and an alkaline metal or alkaline earth metal as a NOx trapping material.

In recent years, in the lean-burn engines, in order to exhibit the merit thereof in terms of fuel economy, efforts have been made to expand the lean operation range. Because of this, there have been developed various NOx trapping catalysts which can obtain a high NOx removing or reducing performance even in the event the lean operation range is expanded. On the other hand, since expensive noble metals are used in the NOx trapping catalysts for adsorbing NOx as nitrate, the NOx trapping catalysts are regarded as one of expensive automotive parts.

Currently, due to the aforesaid situations, there exists a demand for NOx trapping catalysts which can maintain their maximum NOx reducing performance while concurrently suppressing the production costs by improving the current utilization state of the expensive noble metals. Although such a utilization state of noble metals is disclosed in the related technology described in JP-2006-26635, the technology discloses nothing about a way of using noble metals which can make production costs compatible with performance.

SUMMARY OF THE INVENTION

It is therefore an object of the invention to provide an exhaust gas purifying catalyst which can maintain maximum NOx reducing performance while concurrently suppressing production costs.

In order to achieve the object, according to the invention, there is provided an exhaust gas purifying catalyst which is disposed in an exhaust pipe of an internal combustion engine, the exhaust gas purifying catalyst comprising:
a substrate; and
a catalyst layer, supported in the substrate and including:
noble metals including platinum (Pt) and palladium (Pd);
a heat-resistant inorganic oxide; and
a NOx trapping material, wherein
the exhaust gas purifying catalyst adsorbs NOx in an exhaust gase when an exhaust air-fuel ratio is in a lean state and desorbs and reduces the adsorbed NOx when the exhaust air-fuel ratio is in a stoichiometric state or a rich state, and
(Pt/Pd) which is a ratio of amount of the platinum (Pt) to amount of the palladium (Pd) is 0.7 or more and less than 1.0.

The NOx trapping material may be an alkaline metal or an alkaline earth metal.

The alkaline metal or the alkaline earth metal may be potassium (K).

The internal combustion engine may be a direct injection type internal combustion engine in which fuel is injected directly in a combustion chamber for lean burning, and a three-way catalyst may be disposed downstream of the exhaust gas purifying catalyst.

DETAILED DESCRIPTION OF THE INVENTION

Figure 1:
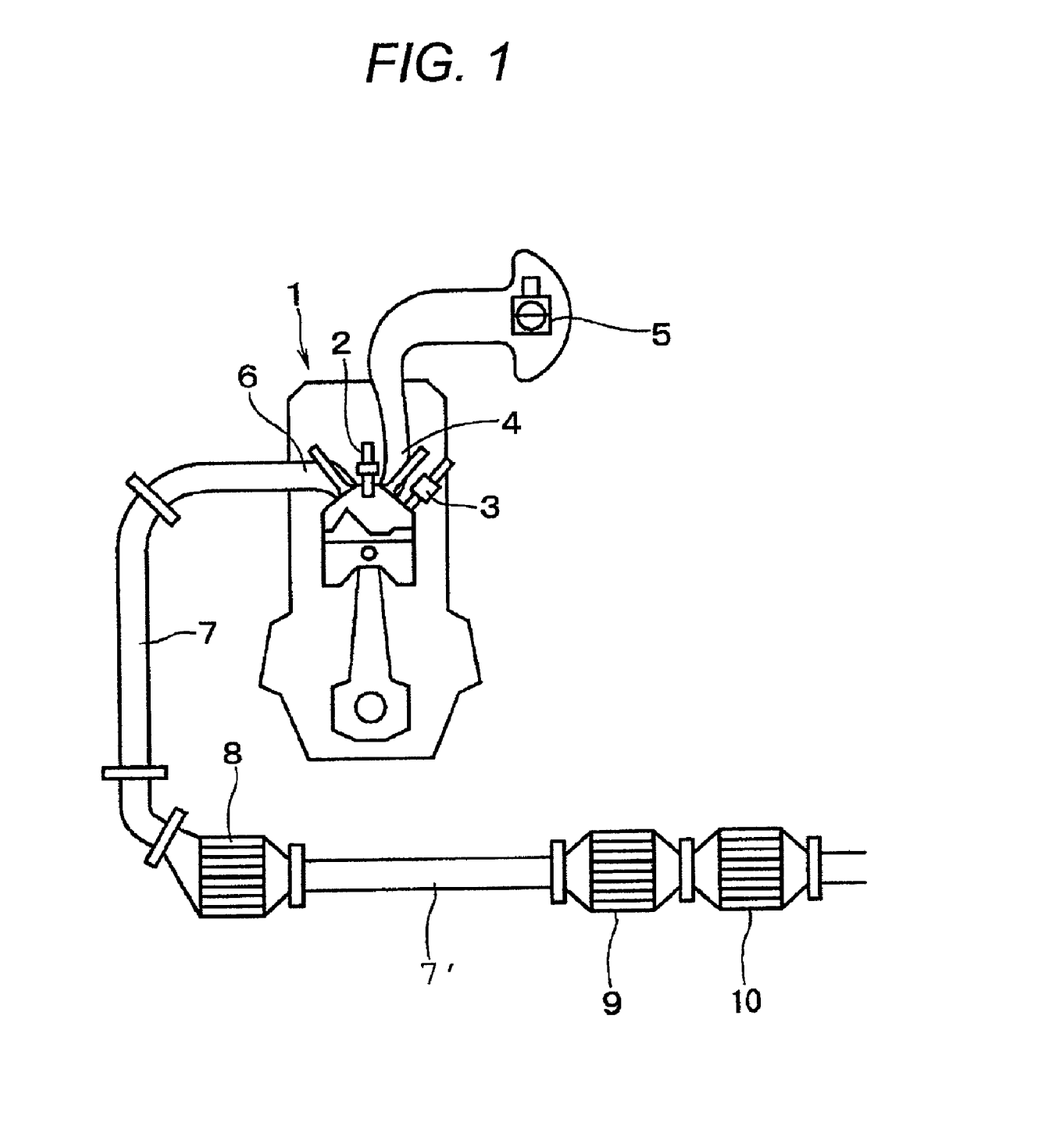
FIG. 1 is a schematic block diagram of an internal combustion engine which includes a NOx trapping catalyst according to an embodiment of the invention.
Figure 2:
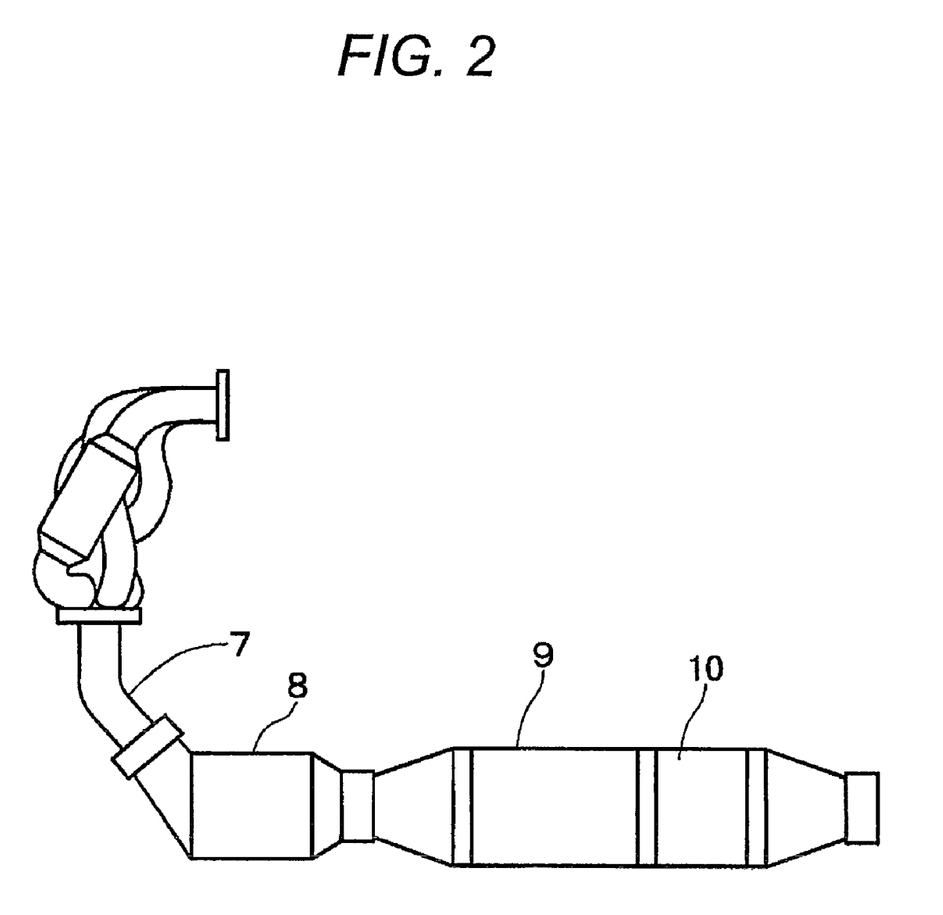
FIG. 2 is a conceptual diagram of an exhaust line.
Figure 3:
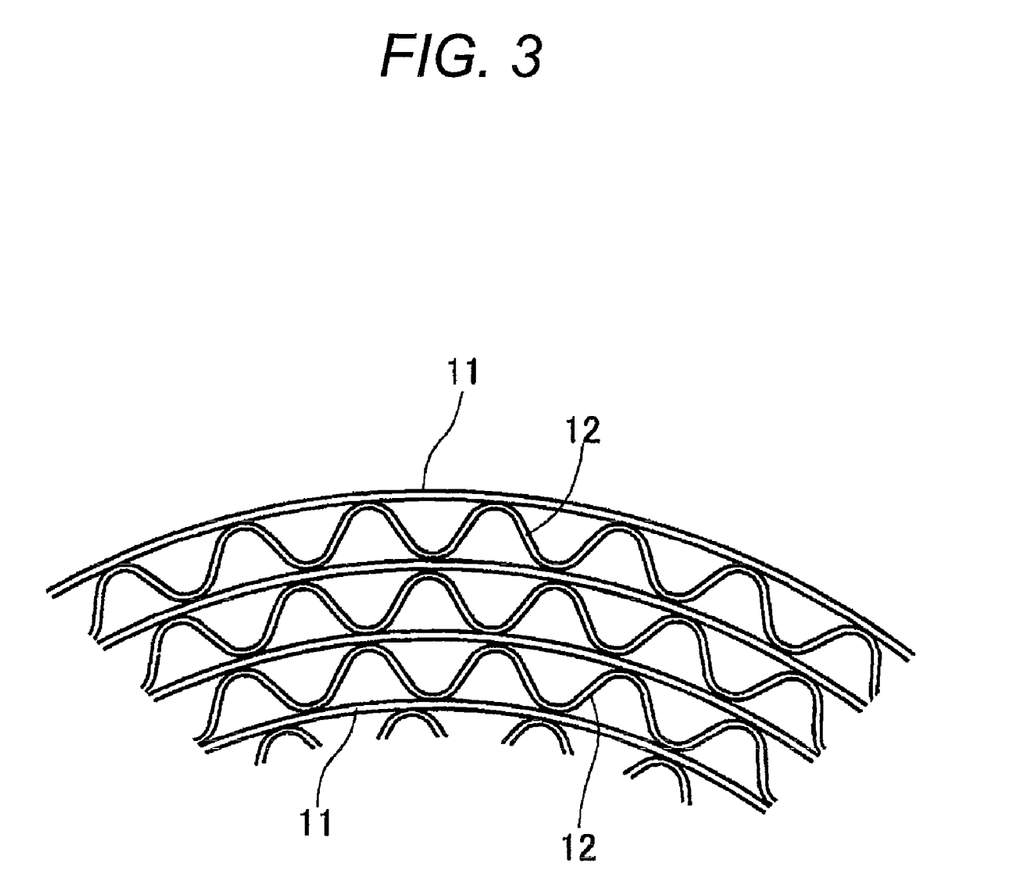
FIG. 3 is an explanatory diagram of a metal substrate.
Figure 4:
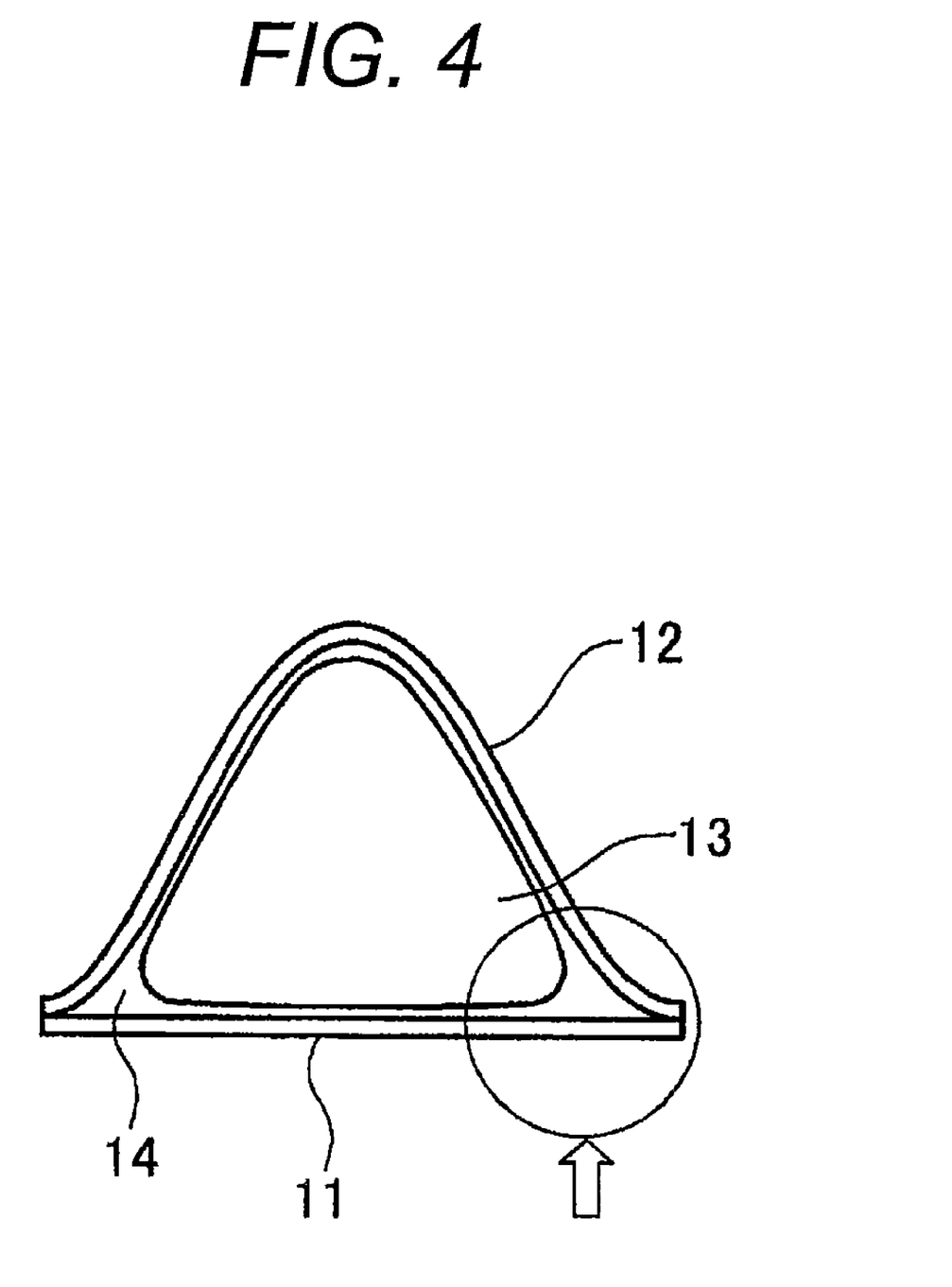
FIG. 4 is a sectional view of a cell in the metal substrate.
Figure 5:
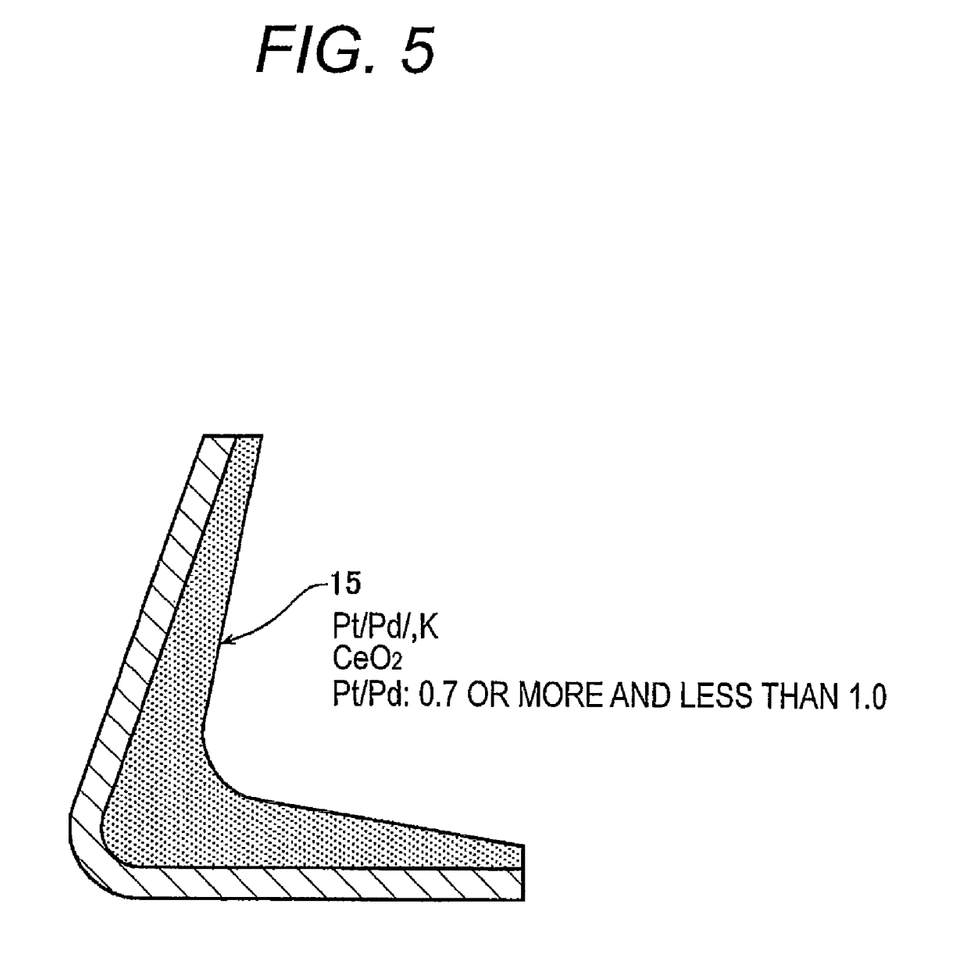
FIG. 5 is an exemplary and explanatory diagram of a catalyst layer of the NOx trapping catalyst according to the embodiment of the invention.

FIG. 1 shows a schematic configuration of an internal combustion engine which includes an exhaust gas purifying catalyst according to an embodiment of the invention, FIG. 2 shows a concept of an exhaust line, FIG. 3 illustrates the configuration of a metal substrate, FIG. 4 shows a section of a cell of the metal substrate, and FIG. 5 illustrates exemplarily a catalyst layer in the exhaust gas purifying catalyst according to the embodiment of the invention.

An internal combustion engine which includes an exhaust gas purifying catalyst according to an embodiment of the invention will be described schematically based on FIGS. 1 and 2.

As is shown in FIG. 1, an internal combustion engine (an engine) 1 is configured as an in-cylinder direct injection type spark ignition multi-cylinder gasoline engine. A spark plug 2 and a fuel injection valve 3 are mounted for each cylinder in a cylinder head of the engine 1, and fuel is injected from the fuel injection valve 3 directly into a combustion chamber. An inlet port 4 is formed for each cylinder in the cylinder head in a substantially vertical direction, and the inlet port 4 is connected to a throttle valve 5 via an inlet manifold.

As is shown in FIGS. 1 and 2, an exhaust port 6 is formed in the cylinder head in a substantially horizontal direction, and an upstream exhaust pipe 7 is connected to the exhaust port 6 via an exhaust manifold. An upstream catalyst 8 is disposed on an upstream side of a downstream exhaust pipe 7', and a NOx trapping catalyst 9 is disposed on a downstream side of the downstream exhaust pipe 7'.

In the NOx trapping catalyst 9, a catalyst layer is supported in a ceramic or metal substrate, and the catalyst layer includes noble metals such as Pt and Pd, a heat-resistant inorganic oxide such as alumina and a NOx trapping material such as an alkaline metal or an alkaline earth metal. As the NOx trapping material, K is preferably used which is an alkaline metal.

The NOx trapping catalyst 9 functions to adsorb NOx in exhaust gases as a nitrate X—NO3 when the exhaust air-fuel ratio is a lean air-fuel ratio and to desorb the adsorbed NOx to reduce the NOx to N2 when the exhaust air-fuel ratio is a stoichiometric air-fuel ratio or rich air-fuel ratio in which a large amount of reductants exists.

A three-way catalyst 10 is disposed downstream of the NOx trapping catalyst 9. In the three-way catalyst 10, a catalyst layer is supported in a ceramic or metal substrate. The catalyst layer includes noble metals such as Pt, Rh and Pd and zeolite as a trapping material for K that is the NOx trapping material. The three-way catalyst 10 functions to purify exhaust gases to remove CO, HC and NOx which exist in the exhaust gases when the exhaust air-fuel ratio is near the stoichiometric air-fuel ratio.

The NOx trapping catalyst 9 will be described specifically based on FIGS. 3 to 5.

As is shown in FIGS. 3 and 4, a substrate for the NOx trapping catalyst 9 is formed by winding flat foils 11 and corrugated foils 12, which are both made of a JIS-specified stainless steel or SUS, are laminated into a spiral configuration, so that a large number of cells 13 are formed in the substrate. Because of this, corner portions of an acute angle are produced in one cell 13. A catalyst layer 14 is formed in an interior of the cell 13, and due to the acute-angled corner portions being produced in the cell 13, the catalyst layer 14 becomes thick at the corner portions (refer to a part indicated by an arrow in FIG. 4).

Minute pores of the order of 1 μm to 10 μm, for example, are formed in the catalyst layer 14. By the minute pores being so formed, the diffusivity of exhaust gases can be promoted even though the catalyst layer 14 becomes thick at the acute-angled corner portions of the cell 13, thereby making it possible to maintain high the NOx reduction performance at the corner portions of the cell 13.

When minute pores of the order of 1 μm to 10 μm are formed in the catalyst layer 14, it is preferable that magnesia (MgO) is added to slurry from which a catalyst layer 14 is formed, so that after calcining, minute pores are formed in a resulting catalyst layer 14 by the MgO being shrunk.

A condition will be described based on FIG. 5 in which a coat of slurry from which a catalyst layer 14 is formed is applied to the cell 13.

As is shown in FIG. 5, a slurry layer (a coating layer) 15 which is applied to the cell 13 includes a heat-resistant inorganic oxide such as alumina, noble metals including Pt and Pd, and a NOx trapping material such as an alkaline metal or an alkaline earth metal.

The amount of the noble metals is preferably in the range from 0.1 g/L to 15 g/L and is more preferably in the range from 0.5 g/L to 5 g/L. The amount of the heat-resistant inorganic oxide is preferably in the range from 10 g/L to 400 g/L and is more preferably in the range from 50 g/L to 300 g/L. The amount of the NOx trapping material is preferably in the range from 5 g/L to 50 g/L, and the amount of the NOx trapping material added in this embodiment is 25 g/L, for example.

K can preferably be used as the NOx trapping material. By using K, a performance particularly in a high temperature region can be increased. In addition, in a substrate formed from a ceramic material such as cordierite, K migrates to combine with cordierite at high temperatures to thereby reduce the strength of the substrate. Therefore, when K is used, a substrate formed of a JIS specified stainless steel or SUS can be used to avoid the problem of K combining with cordierite.

Zeolite can be added to the coating layer 15 for stabilizing K, and 5 g/L to 50 g/L zeolite can be added to the coating layer 15.

Titania (TiO2) can be added to the coating layer 15 for suppressing poisoning by sulfur (S), and 1 g/L to 50 g/L TiO2 can be added to the coating layer 15. Generally, TiO2 has insufficient thermal resistance, and hence, there is caused concern that the specific surface area thereof is reduced after it has managed to endure a severe heated condition, resulting in a reduction in activity. Because of this, as to TiO2 to be added to the NOx trapping catalyst, a TiO2 material having high thermal resistance is preferably used.

In the catalyst layer 14, a support amount ratio of Pt to Pd, both of which are noble metals, (Pt/Pd) is set to be in a range from 0.7 or more to less than 1.0. Since Pt is more expensive than Pd, by the ratio of Pt to Pd being set to be 0.7 or more and less than 1.0, the emission amount of NOx can be suppressed over a wide temperature range without increasing the production costs.

When the ratio of Pt to Pd is reduced to less than 0.7, the emission amount of NOx increases drastically, and when the ratio of Pt to Pd is 1.0 or more (even in the event of Pt being increased), the emission amount of the NOx slightly increases. Because of this, by the ratio of Pt to Pd, supported in the catalyst layer, 14 being set to be 0.7 or more and less than 1.0, the NOx reducing performance can be maintained at its maximum level, while the amount of Pt, which is expensive, used in the catalyst layer 14 can be minimized.

Ceria (CeO2) can be added to the catalyst layer 14 for increasing the activity of Pt. By the addition of CeO2, the activity of Pt, where the Pt ratio is limited to the specified range, can be increased. Here, as CeO2 to be added, a CeO2 material is preferred whose oxygen storage capacity (OSC) is low because such a CeO2 material consumes little a reducing agent when the engine is switched from a lean operation to a rich operation. In addition, a CeO2 material whose particle diameter is small like one whose primary particle has a single nanosize diameter is preferred for use for the catalyst layer 14 because such a CeO2 material can increase the dispersion of exhaust gases in the catalyst layer 14 and prevent the agglomeration of the noble metals.

A preparation method of the NOx trapping catalyst will be as follows, for example.

Water-soluble noble metal salts, heat-resistant inorganic oxide and water-soluble salt of alkaline metal and/or water-soluble salt of alkaline earth metal are dissolved or dispersed in water, and the solution or dispersion is wet-milled into slurry. A metal substrate is immersed in the slurry, and the metal substrate from which excess slurry has been removed is dried and calcined to obtain a NOx trapping catalyst. A drying temperature ranging from 100° C. to 250° C. and a calcining temperature ranging from 350° C. to 650° C. can be used.

Results of evaluations of the NOx trapping catalyst 9 that has been described heretofore will be described based on FIGS. 6 to 9.

Figure 6:
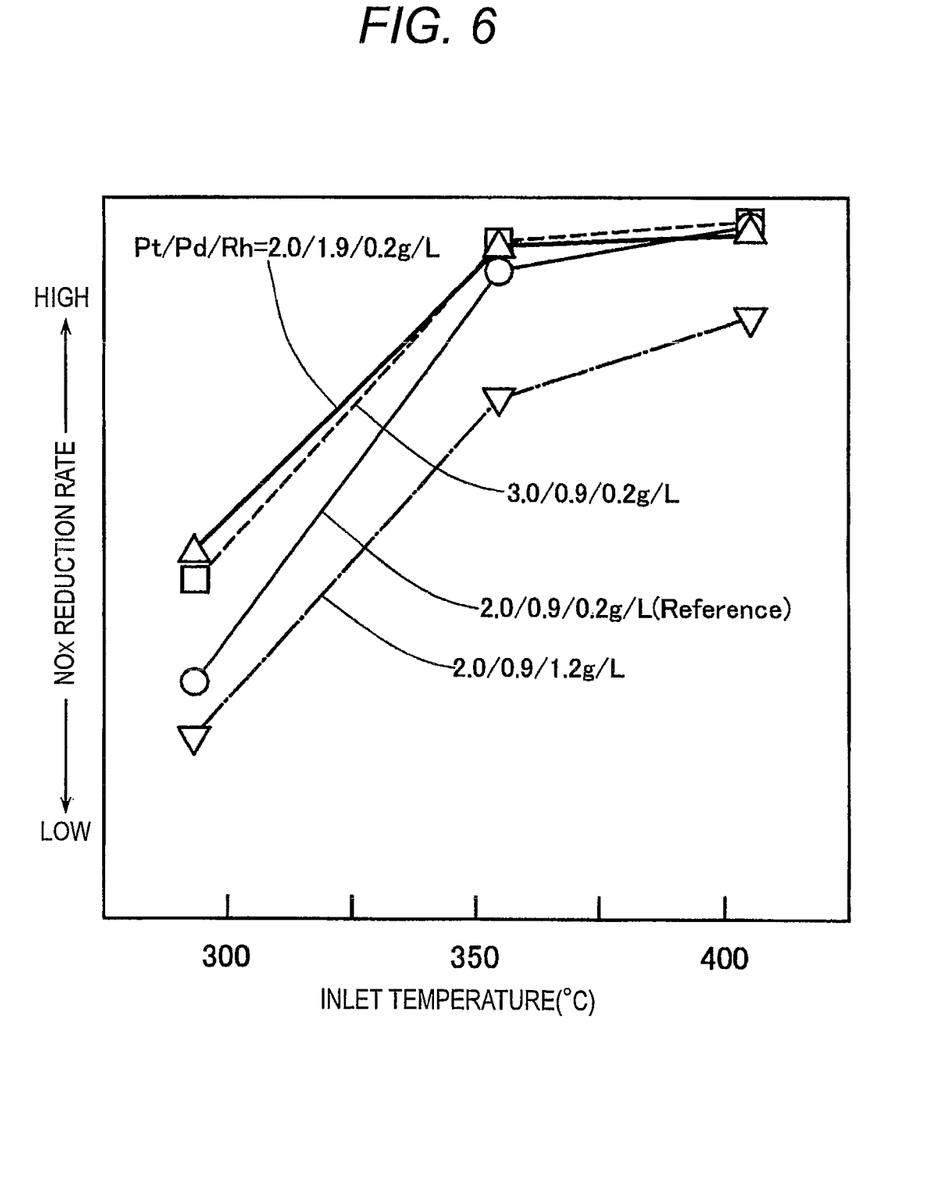
FIG. 6 is a graph representing a relationship between NOx reduction rate (%) and catalyst inlet temperature.

FIG. 6 shows a relationship between NOx reduction rate and catalyst inlet temperature. FIG. 6 represents a relationship between an amount of noble metals increased and NOx reduction rate relative to a comparison example (a reference).

In the figure, a series of marks ○ indicates a base catalyst in which support amounts (g/L) of Pt, Pd and Rh are referred to as 2.0 g/L, 0.9 g/L and 0.2 g/L, respectively. In the figure, a series of marks □ indicates a catalyst in which Pt is increased by 1.0 g/L so that support amounts of Pt, Pd and Rh are referred to as 3.0 g/L, 0.9 g/L and 0.2 g/L, respectively. In the figure, a series of marks Δ indicates a catalyst in which Pd is increased by 1.0 g/L so that support amounts of Pt, Pd and Rh are referred to as 2.0 g/L, 1.9 g/L and 0.2 g/L, respectively. In addition, a series of marks ∇ denotes a catalyst in which Rh is increased by 1.0 g/L so that support amounts of Pt, Pd and Rh are referred to as 2.0 g/L, 0.9 g/L and 1.2 g/L, respectively.

As is shown in FIG. 6, it is seen that the NOx reduction rate is increased to become higher in a temperature region ranging from 300° C. to 400° C. in the catalyst (indicated by the marks □) in which Pt is increased and the catalyst (indicated by the marks Δ) in which Pd is increased than the base catalyst (indicated by the marks ○). In addition, it is seen that the NOx rate is reduced to become lower in a temperature region ranging from 300° C. to 400° C. in the catalyst (indicated by the marks ∇) in which Rh is increased than the base catalyst (indicated by the marks ○).

It is seen from these facts that the NOx rate can be improved by increasing the amounts of Pt and Pd.

Figure 7:
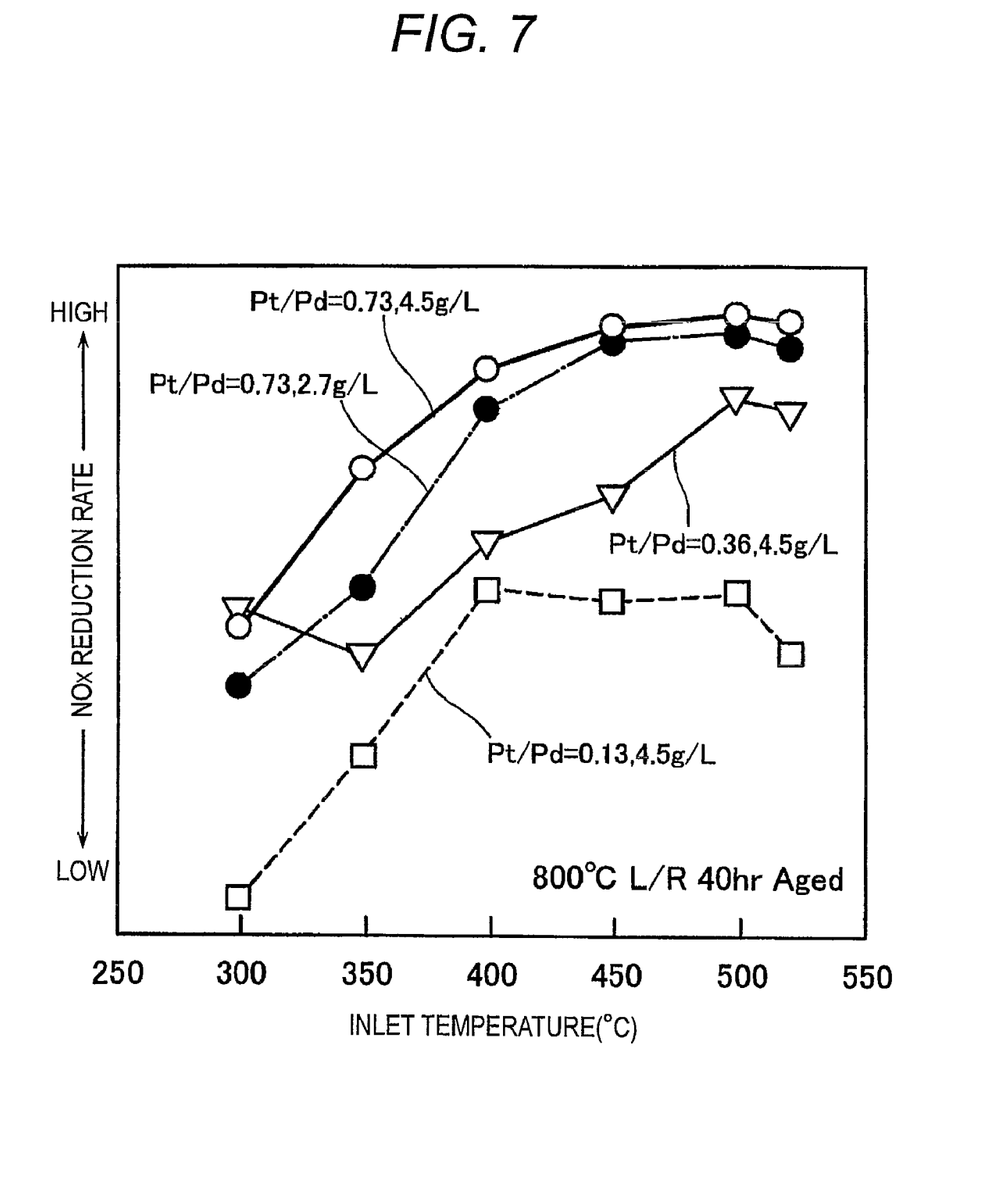
FIG. 7 is a graph representing a relationship between NOx reduction rate (%) and catalyst inlet temperature.

FIG. 7 shows a relationship between NOx reduction rate and catalyst inlet temperature. FIG. 7 represents a relationship between ratio of Pt to Pd and NOx reduction rate in the catalysts which have been in operation 40 hours with the engine running lean and rich at a catalyst temperature of 800° C.

In the figure, series of marks ○, ∇ and □ indicate catalysts in which the support amount of noble metals (Pt+Pd) is set to 4.5 g/L. In the figure, a series of marks ○ indicates a catalyst in which (Pt/Pd) is set to 0.73, a series of marks ∇ indicates a catalyst in which (Pt/Pd) is reduced to 0.36, and a series of marks □ indicates a catalyst in which (Pt/Pd) is reduced to 0.13. FIG. 7 shows that the NOx reduction rate decreases with the decreasing Pt ratio.

It is seen from the fact above that even with the large support amount of noble metals (Pt+Pd), the NOx reduction rate decreases when the Pt ratio is reduced to less than 0.73.

In addition, in FIG. 7, a series of marks ● indicates a catalyst in which the support amount of noble metals (Pt+Pd) is reduced to 2.7 g/L and (Pt/Pd) is set to 0.73. As is shown in the figure, even in the event that the support amount of noble metals (Pt+Pd) is reduced, a reduction in the NOx reduction rate is small by the Pt ratio being set to 0.73, and the NOx reduction rate is maintained higher than the catalysts (indicated by the marks ∇ and □) in which the support amount of noble metals (Pt+Pd) is maintained at the higher level while reducing the Pt ratio.

It is seen from this fact that the NOx reduction rate can be improved by the Pt ratio being set to 0.73 without increasing largely the support amount of noble metals (Pt+Pd).

Figure 8:
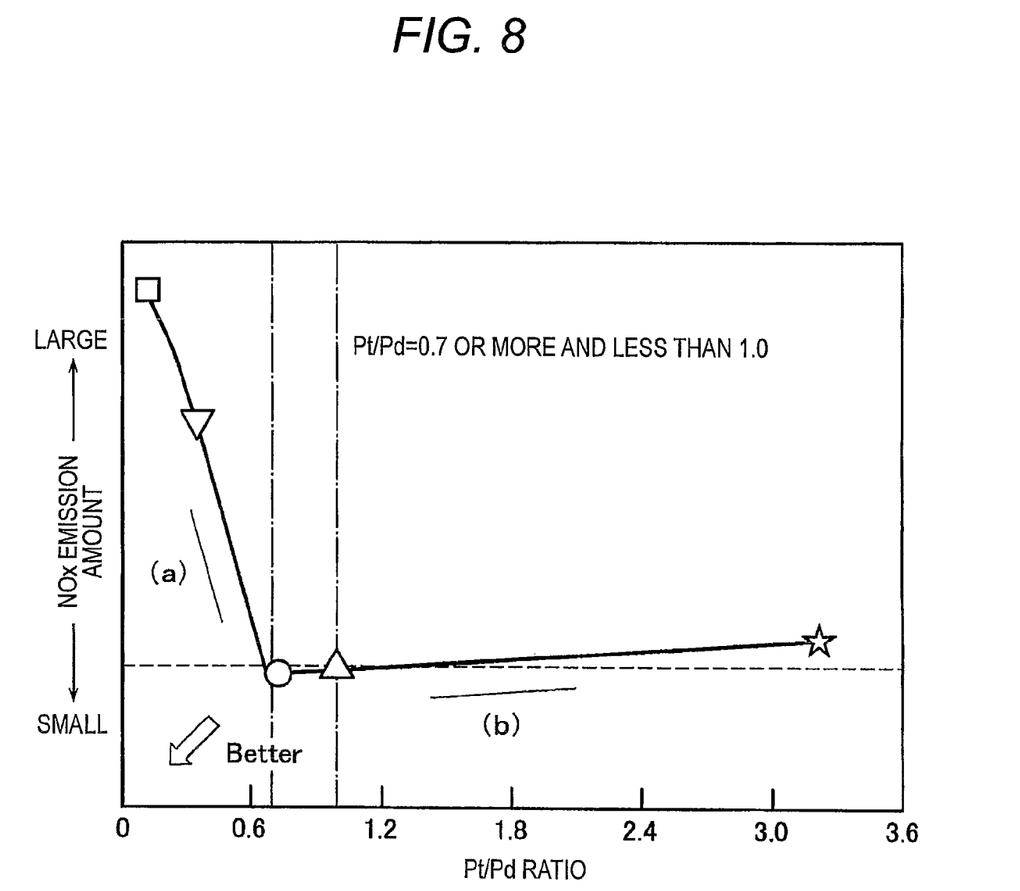
FIG. 8 is a graph representing a relationship between NOx emission amount and a ratio of support amount of noble metals.

FIG. 8 shows a relationship between NOx emission amount and a ratio of support amount of noble metals. FIG. 8 represents effect that the ratio of Pt to Pd has on the NOx reduction amount.

In the figure, points where marks ○, ∇ and □ are plotted are made to correspond to the ratios of Pt to Pd (Pt/Pd), shown in FIG. 7.

As is shown in FIG. 8, it is seen that the NOx emission amount increases drastically in regions where the ratio of Pt to Pd, that is, (Pt/Pd) which is the ratio of Pt to Pd which are supported in the catalysts is lower than 0.7 (the points marks ○, ∇ and □ are plotted). In addition, the NOx emission amount does not change much but only increases slightly even in the event of the ratio of Pt to Pd being 1.0 or more (even in the event of Pt being increased).

It is seen that a maximum NOx reducing performance can be obtained with a minimum ratio of Pt to Pd by setting (Pt/Pd), which is the ratio of Pt to Pd which are supported in the catalysts, to fall in a range from 0.7 or more to less than 1.0.

Figure 9:
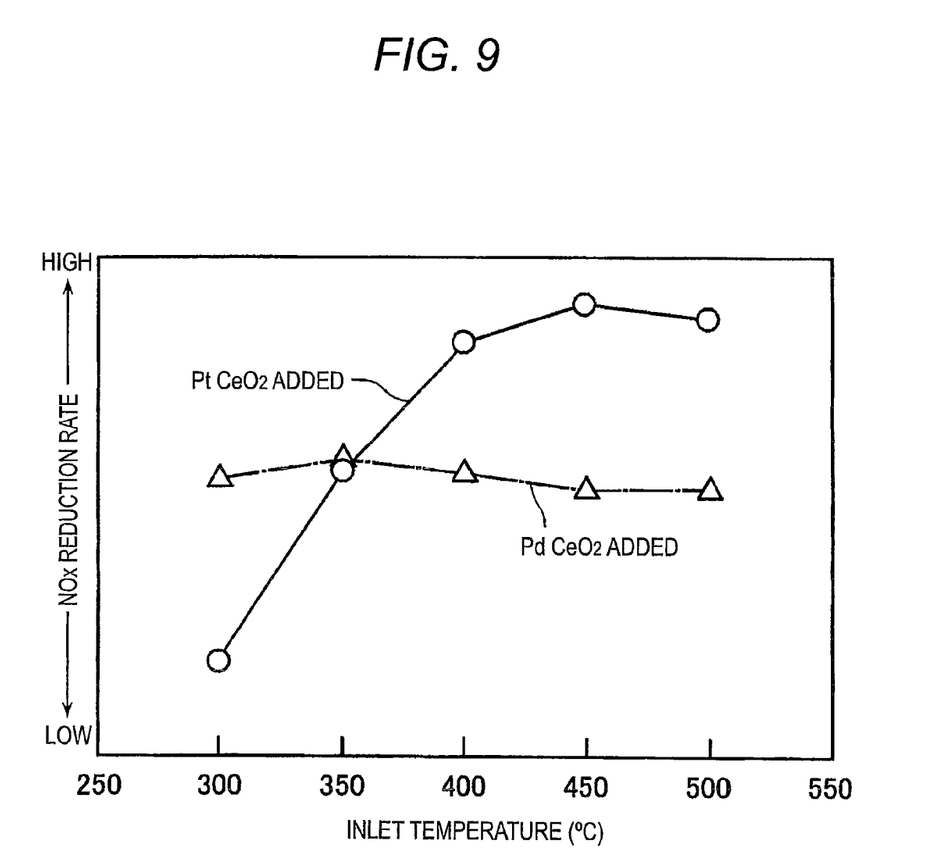
FIG. 9 is a graph representing a relationship between NOx reduction rate (%) and catalyst inlet temperature.

The reason that the maximum NOx reducing performance can be obtained by setting (Pt/Pd), which is the ratio of Pt to Pd which are supported in the catalysts, to fall in the range from 0.7 or more to less than 1.0 will be explained based on FIG. 9. FIG. 9 shows a relationship between NOx reduction rate and catalyst inlet temperature. FIG. 9 shows a temperature property of a Pt catalyst (indicated by a series of marks ○) and a temperature property of a Pd catalyst (indicated by a series of marks Δ).

As a whole, the NOx reducing performance of the Pt catalyst (indicated by the series of marks ○) is increased partly because CeO2 is supported therein for increasing the activity of Pt. Because of this, it is seen from what is shown at a portion (a) in FIG. 8 that the NOx emission amount is reduce to increase the NOx reducing performance by increasing the ratio of Pt to Pd.

When dispersing Pt and Pd on the heat-resistant inorganic oxide, when the support amount of Pt becomes too much, the agglomeration of Pt progresses after the catalyst has managed to endure heating, resulting in a reduction in activity. Namely, compared with Pd, Pt is faster to agglomerate when it is subjected to an increasing heat load. Because of this, as is shown at a portion (b) in FIG. 8, when the ratio of Pt to Pd is increased, the performance is slightly decreased although the decrease is small. In other words, an excessive increase in the Pt ratio, where the Pt is expensive, does not necessarily lead to an improvement in performance.

It is seen from this fact that the maximum NOx reducing performance can be obtained by setting (Pt/Pd) to fall in the range from 0.7 or more to less than 1.0 while suppressing the amount of Pt, which is expensive, used to the minimum level.

As is indicated by the series of marks Δ in FIG. 9, the Pd catalyst shows a substantially constant NOx reduction rate from lower to higher temperatures with a tendency of the NOx reduction rate decreasing slightly as the temperature increases. As is indicated by the series of marks ○ in FIG. 9, with the Pt catalyst, the NOx reduction rate is low in a low temperature region below 300° C., and a high NOx reduction rate is obtained in a high temperature range of 300° C. or higher.

Because of this, Pd contributes to activation in the low temperature region, and Pt contributes to activation in the high temperature region. Therefore, it is seen from this fact that in order to obtain a good activating condition over a wide temperature range with a limitation imposed on the total amount of noble metals in the catalyst layer, (Pt/Pd) is preferably set to fall in the range from 0.7 or more to less than 1.0.

Consequently, with the NOx trapping catalyst 9, the maximum NOx reducing performance can be maintained while suppressing the production costs.

It is possible to support, as a noble metal, Rh which has a high performance as a NOx reducing constituent. In addition, while the NOx trapping catalyst 9 of the present invention has been described as being provided in the exhaust line of the in-cylinder direct injection engine, the NOx trapping catalyst 9 can be used to be provided in an exhaust line of a diesel engine for removal of NOx.

According to an aspect of the invention, by setting the ratio of Pt to Pd, supported in the catalyst layer, to fall in the range from 0.7 or more to less than 1.0, the NOx emission amount can be suppressed over the wide temperature range without increasing the production costs. Namely, when the ratio of Pt to Pd becomes less than 0.7, the NOx emission amount increases drastically, and even when the ratio of Pt to Pd becomes 1.0 or more, there is not much a change in the NOx emission amount. Because of this, by setting the ratio of Pt to Pd to 0.7 or more and less than 1.0, the amount of Pt, which is expensive, can be suppressed to the minimum level in such a state that the maximum NOx reducing performance can be maintained.

Although Japanese Patent No. 3724708 discloses a ratio of Pt to Pd, where the Pt and the Pd are supported in an exhaust gas purifying catalyst, the ratio of Pt to Pd is less than 0.7, and the required NOx reducing performance cannot be obtained.

According to an aspect of the invention, the three-way catalyst is allowed to be responsible for the NOx reducing action even in the event that the amount of noble metals having the performance as NOx reducing constituents is reduced, whereby the total exhaust gas purifying performance is prevented from being reduced.

Ceria (CeO2) which has a low oxygen storage capacity (OSC) and whose particle diameter is minute can be supported in the exhaust gas purifying catalyst for enhancement of the activity of Pt, thereby making it possible to enhance the activity of Pt where the Pt ratio has been set, by CeO2 whose particle diameter is minute.

In addition, in the event that a catalyst is adopted as the exhaust gas purifying catalyst in which a metal substrate is used which comprises cells each having corner portions which are formed acute in angle and minute pores are provided in the catalyst layers which minute pores are formed by adding a pore formation promoting agent and calcining, exhaust gases are diffused through the minute ports formed in the catalyst layers, whereby even in the event that the catalyst layer becomes thick at the acute-angled corner portions of the single cell, the diffusivity of exhaust gases is improved, thereby making it possible to increase the NOx reducing performance even when the metal substrate is used.

According to an aspect of the invention, the maximum NOx reducing performance can be maintained while suppressing the production costs.

The present invention can be applied to the industrial field of exhaust gas purifying catalysts for purifying exhaust gases emitted from internal combustion engines by removing NOx therein.

What is claimed is:

1. An exhaust gas purifying catalyst which is disposed in an exhaust pipe of an internal combustion engine, the exhaust gas purifying catalyst comprising:
   a substrate; and
   a catalyst layer, supported in the substrate and including:
      noble metals including platinum (Pt) and palladium (Pd);
      a heat-resistant inorganic oxide; and
      a NOx trapping material, wherein
   the exhaust gas purifying catalyst adsorbs NOx in an exhaust gas when an exhaust air-fuel ratio is in a lean state and desorbs and reduces the adsorbed NOx when the exhaust air-fuel ratio is in a stoichiometric state or a rich state, and
   (Pt/Pd) which is a ratio of amount of the platinum (Pt) to amount of the palladium (Pd) is 0.7 or more and less than 1.0.

2. The exhaust gas purifying catalyst according to claim 1, wherein
   the NOx trapping material is an alkaline metal or an alkaline earth metal.

3. The exhaust gas purifying catalyst according to claim 2, wherein
   the alkaline metal or the alkaline earth metal is potassium (K).

4. The exhaust gas purifying catalyst according to claim 1, wherein
   the internal combustion engine is a direct injection type internal combustion engine in which fuel is injected directly in a combustion chamber for lean burning, and
   a three-way catalyst is disposed downstream of the exhaust gas purifying catalyst.

5. The exhaust gas purifying catalyst according to claim 1, wherein
   The substrate is made of metal and has corner portions of an acute angle in an interior of a cell thereof, and
   minute pores are formed in the catalyst layer supported on the corner portions.

* * * * *